US012775786B2

(12) United States Patent
Chai et al.

(10) Patent No.: US 12,775,786 B2
(45) Date of Patent: Oct. 27, 2026

(54) TRAINING A COMPUTER-IMPLEMENTED CONDITIONAL LANGUAGE MODEL FOR IMPROVED PERFORMANCE

(71) Applicant: Microsoft Technology Licensing, LLC, Redmond, WA (US)

(72) Inventors: Junyi Chai, Pasadena, CA (US); Konstantin Golobokov, Seattle, WA (US); Ye Dong, Redmond, WA (US); Reid Allen Pryzant, Seattle, WA (US); Yi Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 879 days.

(21) Appl. No.: 17/842,735

(22) Filed: Jun. 16, 2022

(65) Prior Publication Data

US 2023/0409826 A1 Dec. 21, 2023

(51) Int. Cl.

| | |
|---|---|
| ***G06F 40/20*** | (2020.01) |
| ***G06F 16/951*** | (2019.01) |
| ***G06F 40/166*** | (2020.01) |
| ***G06F 40/40*** | (2020.01) |

(52) U.S. Cl.

CPC ............ *G06F 40/20* (2020.01); *G06F 16/951* (2019.01); *G06F 40/166* (2020.01); *G06F 40/40* (2020.01)

(58) Field of Classification Search

CPC ...... G06F 40/20; G06F 16/951; G06F 40/166; G06F 40/40; G06F 40/30

See application file for complete search history.

(56) References Cited

U.S. PATENT DOCUMENTS

| | | | | |
|---|---|---|---|---|
| 2009/0198667 | A1* | 8/2009 | Groeneveld | G06F 16/345 707/999.005 |
| 2019/0034764 | A1* | 1/2019 | Oh | G06F 18/2148 |
| 2019/0236148 | A1* | 8/2019 | DeFelice | G06N 3/047 |
| 2021/0286934 | A1* | 9/2021 | Liu | G06F 40/126 |

OTHER PUBLICATIONS

Gu, X., Mao, Y., Han, J., Liu, J., Wu, Y., Yu, C., Finnie, D., Yu, H., Zhai, J. and Zukoski, N., Apr. 2020. Generating representative headlines for news stories. In Proceedings of The Web Conference 2020 (pp. 1773-1784). (Year: 2020).*

Raffel, C., Shazeer, N., Roberts, A., Lee, K., Narang, S., Matena, M., Zhou, Y., Li, W. and Liu, P.J., 2020. Exploring the limits of transfer learning with a unified text-to-text transformer. Journal of machine learning research, 21(140), pp. 1-67. (Year: 2020).*

(Continued)

*Primary Examiner* — Sean E Serraguard

(74) *Attorney, Agent, or Firm* — Shook, Hardy & Bacon L.L.P.

(57) ABSTRACT

Technologies related to computer-implemented conditional language models (CLMs) are described. A first CLM is trained to generate output texts based upon input texts and conditions. Output texts generated by the first CLM are included in a training set, and a second CLM is trained based upon the training set. The second CLM is then configured to receive input text and a condition and generate an output text based upon the input text and the condition.

20 Claims, 7 Drawing Sheets

(56) References Cited

OTHER PUBLICATIONS

An, et al., "Why resampling outperforms reweighting for correcting 542 sampling bias with stochastic gradients", In Proceedings of The Ninth International Conference on Learning Representations, May 3, 2021, pp. 1-19.

Ao, et al., "PENS: A Dataset and Generic Framework for Personalized News Headline Generation", In Proceedings of the 59th Annual Meeting of the Association for Computational Linguistics and the 11th International Joint Conference on Natural Language Processing (vol. 1: Long Papers), Aug. 1, 2021, pp. 82-92.

Carlini, et al., "Extracting training data from large language models", In Proceedings of the 30th USENIX Security Symposium, Aug. 11, 2021, pp. 2633-2650.

Fan, et al., "Controllable Abstractive Summarization", In Proceedings of the 2nd Workshop on Neural Machine Translation and Generation, Jul. 2018, pp. 45-54.

Feder, et al., "Causal Inference in Natural Language Processing: Estimation, Prediction, Interpretation and Beyond", In Repository of arXiv:2109.00725v1, Sep. 2, 2021, 17 Pages.

Ficler, et al., "Controlling Linguistic Style Aspects in Neural Language Generation", In Proceedings of the Workshop on Stylistic Variation, Sep. 7, 2017, pp. 94-104.

Garg, et al., "Counterfactual Fairness in Text Classification through Robustness", In Proceedings of the AAAI/ACM Conference on AI, Ethics, and Society, Jan. 27, 2019, pp. 219-226.

Han, et al., "Balancing out Bias: Achieving Fairness Through Training Reweighting", In Repository of arXiv:2109.08253v1, Sep. 16, 2021, 9 Pages.

Hu, et al., "A Causal Lens for Controllable Text Generation", In Journal of Advances in Neural Information Processing Systems, Dec. 2021, 15 Pages.

Kaushik, et al., "Learning the Difference that Makes a Difference with Counterfactually-Augmented Data", In Proceedings of Eighth International Conference on Learning Representations, Apr. 26, 2020, pp. 1-17.

Keskar, et al., "CTRL: A Conditional Transformer Language Model for Controllable Generation", In Repository of arXiv:1909.05858v1, Sep. 11, 2019, pp. 1-18.

Kikuchi, et al., "Controlling Output Length in Neural Encoder-Decoders", In Proceedings of the Conference on Empirical Methods in Natural Language Processing, Nov. 2016, pp. 1328-1338.

Lee, et al., "Deduplicating Training Data Makes Language Models Better", In Repository of arXiv:2107.06499v1, Jul. 14, 2021, pp. 1-20.

Lewis, et al., "BART: Denoising Sequence-to-Sequence Pre-training for Natural Language Generation, Translation, and Comprehension", In Proceedings of the 58th Annual Meeting of the Association for Computational Linguistics, Jul. 5, 2020, pp. 7871-7880.

Liu, et al., "Controlling Length in Abstractive Summarization Using a Convolutional Neural Network", In Proceedings of the Conference on Empirical Methods in Natural Language Processing, Oct. 31, 2018, pp. 4110-4119.

Liu, et al., "RoBERTa: A Robustly Optimized BERT Pretraining Approach", In Repository of arXiv:1907.11692v1, Jul. 26, 2019, 13 Pages.

Lu, et al., "Gender Bias in Neural Natural Language Processing", In Repository of arXiv:1807.11714v1, Jul. 31, 2018, 13 Pages.

Pearl, Judea, "Causal Inference in Statistics: An Overview", In Journal of Statistics Surveys, vol. 3, Oct. 13, 2009, pp. 96-146.

Rosenbaum, et al., "The central role of the propensity score in observational studies for causal effects", In Journal Biometrika, vol. 70, No. 1, Apr. 1, 1983, pp. 41-55.

Schnabel, et al., "Recommendations as treatments: Debiasing learning and evaluation", In Proceedings of 33rd International Conference on Machine Learning, Jun. 11, 2016, 10 Pages.

Sennrich, et al., "Controlling politeness in neural machine translation via side constraints", In Proceedings of Conference of the North American Chapter of the Association for Computational Linguistics: Human Language Technologies, NAACL HLT 2016, Jun. 12, 2016, pp. 35-40.

Sharma, et al., "Evaluating Gender Bias in Natural Language Inference", In Repository of arXiv:2105.05541v1, May 12, 2021, pp. 1-16.

Shen, et al., "MReD: A Meta-Review Dataset for Controllable Text Generation", In Repository of arXiv:2110.07474v1, Oct. 14, 2021, 15 Pages.

Tu, et al., "An Empirical Study on Robustness to Spurious Correlations using Pre-trained Language Models", In Journal of Transactions of the Association for Computational Linguistics, Oct. 1, 2020, pp. 621-633.

Veitch, et al., "Counterfactual Invariance to Spurious Correlations: Why and How to Pass Stress Tests", In Journal of Advances in Neural Information Processing Systems, May 22, 2021, 13 Pages.

Wang, et al., "Learning to rank with selection bias in personal search", In Proceedings of the 39th International ACM SIGIR conference on Research and Development in Information Retrieval, Jul. 17, 2016, pp. 115-124.

Yao, et al., "A Survey on Causal Inference", In ACM Transactions on Knowledge Discovery from Data, vol. 15, Issue 5, May 2021, pp. 1-46.

Zhao, et al., "Gender Bias in Coreference Resolution: Evaluation and Debiasing Methods", In Proceedings of the 2018 Conference of the North American Chapter of the Association for Computational Linguistics: Human Language Technologies, vol. 2, Jun. 2018, pp. 15-20.

"Application as Filed in U.S. Appl. No. 17/565,414", filed Dec. 29, 2021, 37 Pages.

* cited by examiner

TRAINING A COMPUTER-IMPLEMENTED CONDITIONAL LANGUAGE MODEL FOR IMPROVED PERFORMANCE

BACKGROUND

Computer-implemented conditional language models (CLMs) are configured to generate output text based upon input text and a condition assigned to the input text. For example, a CLM receives text from a webpage and generates a summarization of the text of the webpage, with the condition that the generated summarization is to have a specified sentiment (e.g., "happy"). In this example, the sentiment is the condition upon which the CLM is to generate the summarization of the input text. Put differently, a CLM is configured to control a linguistic attribute of output text generated by the CLM, where linguistic attributes may include sentiment, length, politeness, topic, category, etc. Accordingly, a CLM can generate several different output texts based upon the same input text, where each output text corresponds to a respective condition.

In an example, a CLM is configured to perform text summarization. Therefore, length of the input text is greater than length of the output text generated by the CLM. Training data used to train a CLM that is configured to perform text summarization may include spurious (unwanted) correlations between input text in the training data and an attribute under control (the attribute specified by a condition). These spurious correlations may be at least partially caused by the training data being unbalanced. In a specific example, a CLM is to be trained to generate electronic advertisements of nine different categories based upon text extracted from a webpage. Therefore, training data for training the CLM includes tuples that comprise input text, an electronic advertisement that corresponds to the input text, and a category assigned to the electronic advertisement. In this example, then, the category of the electronic advertisement is the attribute under control.

The training data may include a large number of training samples for one of the categories but may include a relatively small number of training samples for another one of the categories, which may be due to one category of electronic advertisement being more popular than another. This lack of balance in the training data may result in the CLM performing sub-optimally with respect to one or more specific types of electronic advertisement.

SUMMARY

The following is a brief summary of subject matter that is described in greater detail herein. This summary is not intended to be limiting as to the scope of the claims.

Described herein are various technologies pertaining to computer-implemented conditional language models (CLMs). With more particularity, described herein are technologies related to generating training data for training a CLM, such that the training data is more balanced than training data conventionally used to train CLMs.

A first CLM is configured to generate output text based upon input text and a condition, where the input text and the condition are provided as input to the first CLM. In an example, the input text is extracted from a webpage. Further, the webpage may include information about a product or service that is available for acquisition by way of the webpage. Moreover, the first CLM can be configured to perform text summarization, such that length of the output text is less than length of the input text. The output text may be a portion of an electronic advertisement (e.g., a title or description of an electronic advertisement), may be a proposed title for a news headline, may be a snippet included in search results to represent content of the webpage, and so forth. When the output text is the portion of the electronic advertisement, the condition may specify one of a predefined number of categories of electronic advertisement. When the output text is a title for a news headline, the condition may specify a length of the title and/or a sentiment of the title. Similarly, when the output text is the snippet, the condition may specify a length of the snippet and/or a sentiment of the snippet.

When the first CLM receives the input text and the condition, the output text generated by the first CLM desirably has an attribute value that is specified by the condition. For example, when the first CLM is configured to generate portions of electronic advertisements, a condition provided to the first CLM specifies a category of the advertisement. Hence, the output text generated by the first CLM (when provided with the input text and the condition as input) is desirably of the category specified by the condition. To generate updated training data, the first CLM is provided with input text and generates several output texts based upon the input text, where the output texts correspond to several different conditions. A classifier receives each output text as input and identifies a value of an attribute of the output text. Continuing with the example related to electronic advertisements, the classifier receives output text (e.g., a portion of an electronic advertisement) and identifies a category of the output text. When the category of the output text identified by the classifier matches the category specified by the condition, the input text, the condition, and the output text are included in training data that is to be used to train a second CLM. Contrarily, when the category of the output text identified by the classifier fails to match the category specified by the condition, the input text, the condition, and the output text are not included in the training data.

Upon a sufficient amount of training data being generated, a second CLM is trained based upon such training data. The generation of this training data allows for creation of a balanced set of training data, such that there are not an inordinate number of examples pertaining to a first condition when compared to the number of examples pertaining to a second condition. Testing has indicated that the second CLM has improved performance when compared to performance of the first CLM with respect to various metrics, such as controllability.

The technologies described herein exhibit various advantages over conventional technologies for training CLMs. Specifically, a CLM is trained through use of a balanced set of training data, thereby addressing issues associated with spurious correlations between attribute values (specified by conditions) and input text in the training data. Additionally, the CLM trained through the technologies described herein has improved performance with respect to controllability when compared to conventionally trained CLMs.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
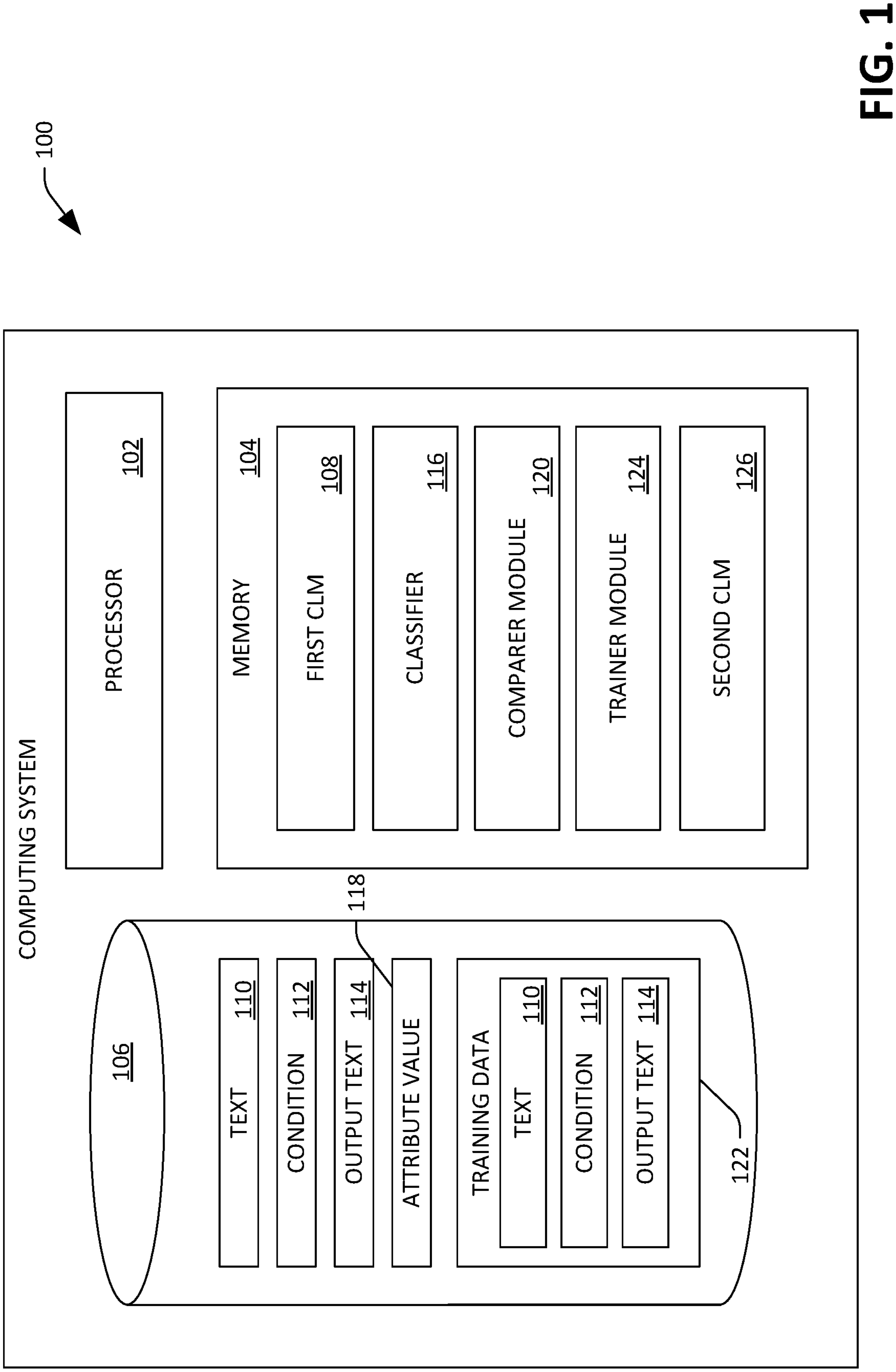
FIG. 1 is a functional block diagram of a computing system that is configured to generate training data for use in training a conditional language model (CLM).

Various technologies pertaining to generating training data for training a computer-implemented conditional language model (CLM) and training such CLM are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "system," "module", and "model" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies pertaining to generating training data for training a CLM and thereafter training the CLM based upon such training data. A first CLM has been trained to generate output text based upon a combination of input text and a condition (from amongst several possible conditions), where the condition specifies a desired attribute value of the output text. Accordingly, for input text, the first CLM can generate several different output texts, depending upon the condition provided as input to the CLM with the input text. Pursuant to an example, the first CLM may have been trained based upon an unbalanced set of training data, where there may be a (much) higher number of training samples for a first condition when compared to the number of training examples for a second condition. The first CLM is employed to generate further training examples such that the training set is updated to be more balanced when compared to the set of training data used to train the first CLM.

More specifically, the first CLM receives input text and a first condition as input to the first CLM. The first CLM then generates first output text based upon the input text and the first condition. The first CLM further receives the input text and a second condition as input to the first CLM, and the first CLM generates second output text based upon the input text and the second condition. This process can repeat for n conditions, such that the first CLM generates n output texts based upon the input text and the n conditions.

The output texts are then provided to a classifier, where the classifier is configured to identify a value of an attribute of each output text received by the classifier. For example, the classifier receives the first output text and identifies a first value of an attribute of the first output text. Further, the classifier receives the second output text and identifies a second value of the attribute of the second output text. As noted above, the first CLM generated the first output text based upon the input text and the first condition, where the first condition specifies a first value of the attribute. Similarly, the first CLM generated the second output text based upon the input text and the second condition, where the second condition specifies a second value of the attribute. When the first value of the attribute specified by the first condition matches the first value of the attribute identified by the classifier for the first output text, then the input text, the first output text, and the first value of the attribute are included in a set of training data as a tuple to be used to train a second CLM. Similarly, when the second value of the attribute specified by the second condition matches the second value of the attribute identified by the classifier for the second output text, then the input text, the second output text, and the second value of the attribute are included in the set of training data as a tuple to be used to train the second CLM. Conversely, when a value of the attribute specified by the condition does not match the value of the attribute identified by the classifier for output text (where the output text was generated based upon the condition), then the input text, output text, and the value of the attribute are not included in the training data (as the first CLM improperly generated the output text). Hence, the first CLM is employed to generate training data that can be used to train a second CLM. This allows for a set of training data to be relatively balanced. The second CLM is then trained based upon this set of training data.

With reference to FIG. 1, a functional block diagram of a computing system 100 that is configured to generate a balanced set of training data for training a CLM is illustrated. The computing system 100 includes a processor 102, memory 104, and a data store 106, where the memory 104 includes instructions that are executed by the processor 102 and the data store 106 includes data that is accessible to the processor 102. The memory 104 includes a first CLM 108, where the first CLM 108 is configured to receive as input: 1) text (or some embedding thereof); and 2) a condition. The first CLM 108 is configured to generate output text based upon the text and the condition.

In an example, the first CLM 108 is configured to perform text summarization, such that length of the text received as input by the first CLM 108 is greater than length of the output text generated by the first CLM 108. Thus, in an example, the first CLM 108 is configured to generate headlines for electronic news articles. In another example, the first CLM 108 is configured to generate at least portions of electronic advertisements (such as title portions and/or description portions) based upon text extracted from webpages where products and/or services are offered for acquisition. In yet another example, the first CLM 108 is configured to generate snippets to be presented in search results by a search engine, where the first CLM 108 generates the snippets based upon text extracted from webpages.

The condition, which may also be referred to as a control code, specifies a desired value of an attribute of output text generated by the first CLM 108, where the first CLM 108 generates the output text based upon input text and the condition. For example, when the first CLM 108 is configured to generate headlines for electronic news articles, the condition can specify a desired length of the headline (e.g., the length is desirably under some threshold number of characters), a sentiment of the headline (e.g., the headline desirably has a happy sentiment, a sad sentiment, etc.), a topic of the headline, and so forth. When the first CLM 108 is configured to generate electronic advertisements, the condition can specify a category of the advertisement. Advertisers typically generate advertisements of several categories, where examples of these categories include "product or service," "call to action," "location," "highlight," "inventory and selection," "advertiser name or brand," "price and fees," "benefit," and "customer problem." Therefore, an advertisement (for a product) of a first category will include different information than an advertisement (for the same product) of a second category. The condition provided as input to the first CLM 108 can specify the category. When the first CLM 108 is configured to perform snippet generation, the condition provided as input to the first CLM 108 can specify a length of the snippet, a topic of the snippet, and so forth. It can be ascertained that the first CLM 108 can generate different output texts for the same input text when different conditions are provided as input to the first CLM 108. More specifically, when the first CLM 108 receives text and a first condition as input, the first CLM 108 may generate first output text, and when the first CLM 108 receives the (same) text and a second condition as input, the first CLM 108 may generate second output text that differs from the first output text.

The data store 106 includes text 110 and a condition 112 that is to be provided as input to the first CLM 108. While the data store 106 is depicted as including the single piece of input text 110 and the single condition 112, it is understood that the data store 106 may include multiple texts and multiple conditions. The text 110, in an example, is extracted from a webpage. The first CLM 108 is configured to receive the text 110 and the condition 112 as input, and is further configured to generate output text 114, where the first CLM 108 generates the output text 114 based upon the text 110 and the condition 112. As noted above, the condition 112 specifies a desired value of an attribute of the output text 114.

The memory 104 additionally includes a classifier 116 that is configured to receive output texts as input and identify actual values of an attribute of the output texts. For example, when provided with portions of electronic advertisements, the classifier 116 can identify categories of the portions of the electronic advertisements. Similarly, when provided with news headlines, the classifier 116 can identify sentiments of the news headlines. Thus, the classifier 116 may receive the output text 114 and identify an actual value of the attribute of the output text 114. The value of the attribute of the output text 114 identified by the classifier 116 can be stored in the data store 106 and/or the memory 104 as an attribute value 118.

The memory 104 additionally includes a comparer module 120 that is configured to compare desired values of the attribute (as specified by conditions) with actual values of the attribute (as identified by the classifier 116). Accordingly, the comparer module 120 can receive the desired attribute value specified by the condition 112 and can further receive the attribute value 118 identified by the classifier 116 and compare the two values. When the comparer module 120 determines that the desired attribute value of the output text 114 (as specified by the condition 112) matches the attribute value 118 of the output text 114 (as identified by the classifier 116), the comparer module 120 can update training data 122 such that the training data 122 includes a combination of the text 110, the condition 112, and the output text 114 as a training sample. Contrarily, when the comparer module 120 determines that the desired attribute value of the output text 114 (as specified by the condition 112) does not match the attribute value 118 of the output text 114 (as identified by the classifier 116), the comparer module 120 refrains from including the combination of the text 114, the condition 112, and the output text 114 in the training data 122.

The memory 104 also includes a trainer module 124 and a second CLM 126, where the trainer module 124 is configured to train the second CLM 126 based upon the training data 122. The training data 122 includes at least some training examples that include output texts generated by the first CLM 108. Hence, the training data 122 used by the trainer module 124 to train the second CLM 126 is more balanced compared to the training data used to train the first CLM 108, as the first CLM 108 can be configured to generate training examples that correspond to attribute values (where there were previously an insufficient number of such training samples). As will be illustrated below, the second CLM 126 exhibits improved performance over the first CLM 108, particularly with respect to controllability, where controllability refers to generating output text that has a value of an attribute that matches the value of the attribute specified in the condition used to generate the output text.

A mathematical description of the operations of the computing system 100 is now set forth. The first CLM 108 can be trained based upon an initial set of training data $D_{tr}$. The first CLM 108 generates output texts for each input text $x_i$ in $D_{tr}$ with every condition with respect to which the first CLM 108 has been trained (with the possible exception of a condition associated with an output text that already exists in $D_{tr}$), i.e., $\forall c \in \{1, \ldots K\}$, $c \neq a_i$, where c is the condition, K is the number of total conditions, and a is the attribute value of the output text. The classifier 116 is used to filter output texts generated by the first CLM 108 that have an attribute value that does not match the value specified by the condition. The original training set $D_{tr}$ is augmented with the generated training examples (that have not been filtered), and the trainer module 124 trains the second CLM 126 using the augmented set of training data.

Figure 2:
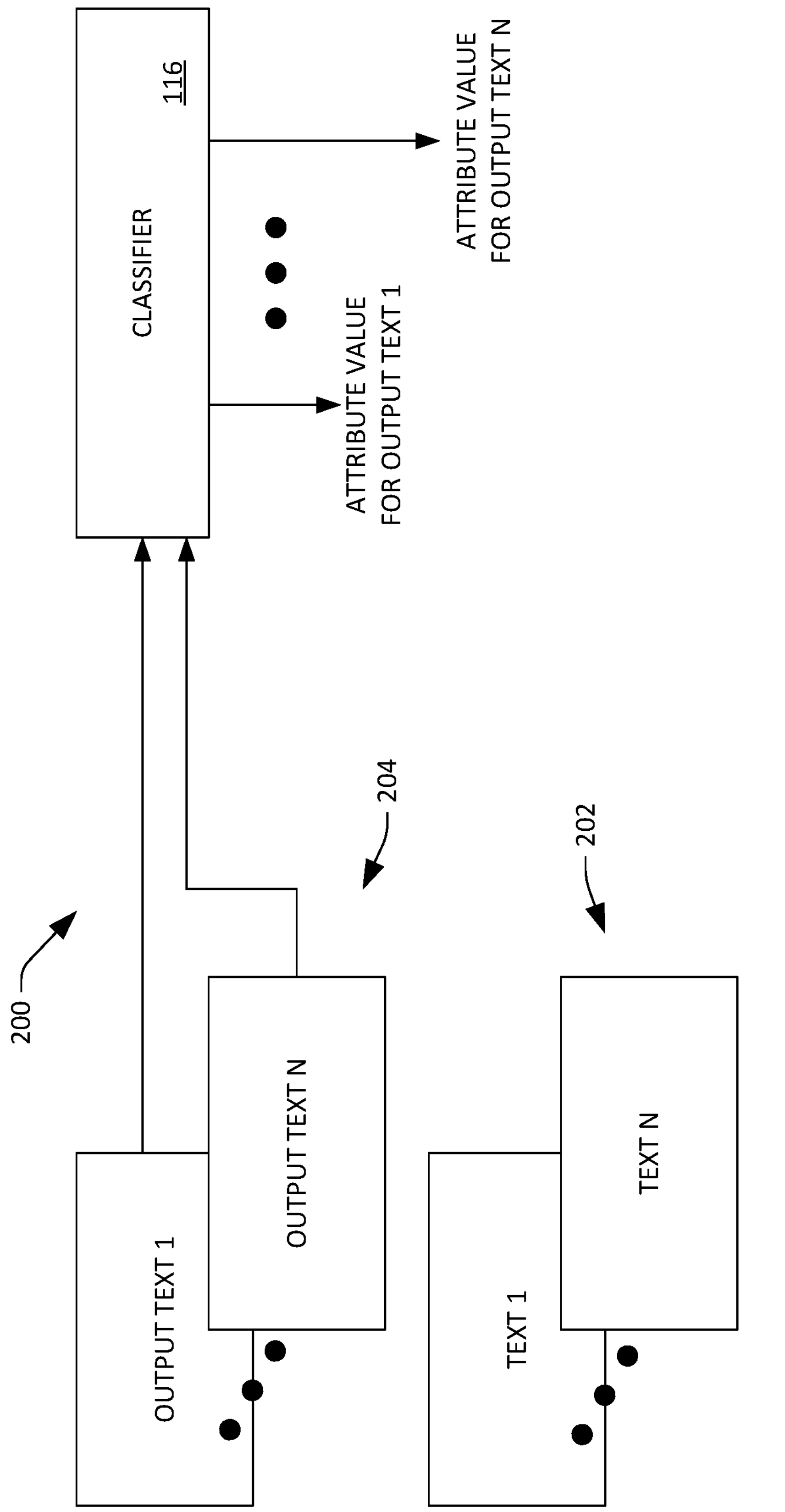
FIG. 2 is a functional block diagram that illustrates a classifier identifying an attribute value of output texts.

Operation of the computing system 100 is now described with reference to FIGS. 2-5. Referring initially to FIG. 2, a functional block diagram 200 depicting generation of a set of training data used to train the first CLM 108 is illustrated. The training data ($D_{tr}$) includes several input texts 202 (e.g., texts extracted from webpages) and output texts 204 that respectively correspond to the input texts 202. In an example, the input texts may be texts extracted from webpages where products and/or services can be purchased, and the output texts 204 may be respective electronic advertisements generated for such webpages. For instance, the electronic advertisements are generated manually by human advertisers.

The classifier 116 receives the output texts 204 and identifies values of the attribute that is to be under control (e.g., values of the attribute that can be specified by a condition). Continuing with the example where the output texts 204 are electronic advertisements, the attribute may be category of electronic advertisement, such that upon receipt of an electronic advertisement the classifier 116 can identify a category of the electronic advertisement from amongst a predefined plurality of categories of electronic advertisement. Based upon output of the classifier 116, tuples of [input text, output text, attribute value] can be generated and used as training data for training the first CLM 108. While not illustrated, it is to be understood that one input text may have several output texts included in the training data; for instance, there may be several electronic advertisements generated by advertisers for a webpage, where the several electronic advertisements can be of a same category or different categories.

Figure 3:
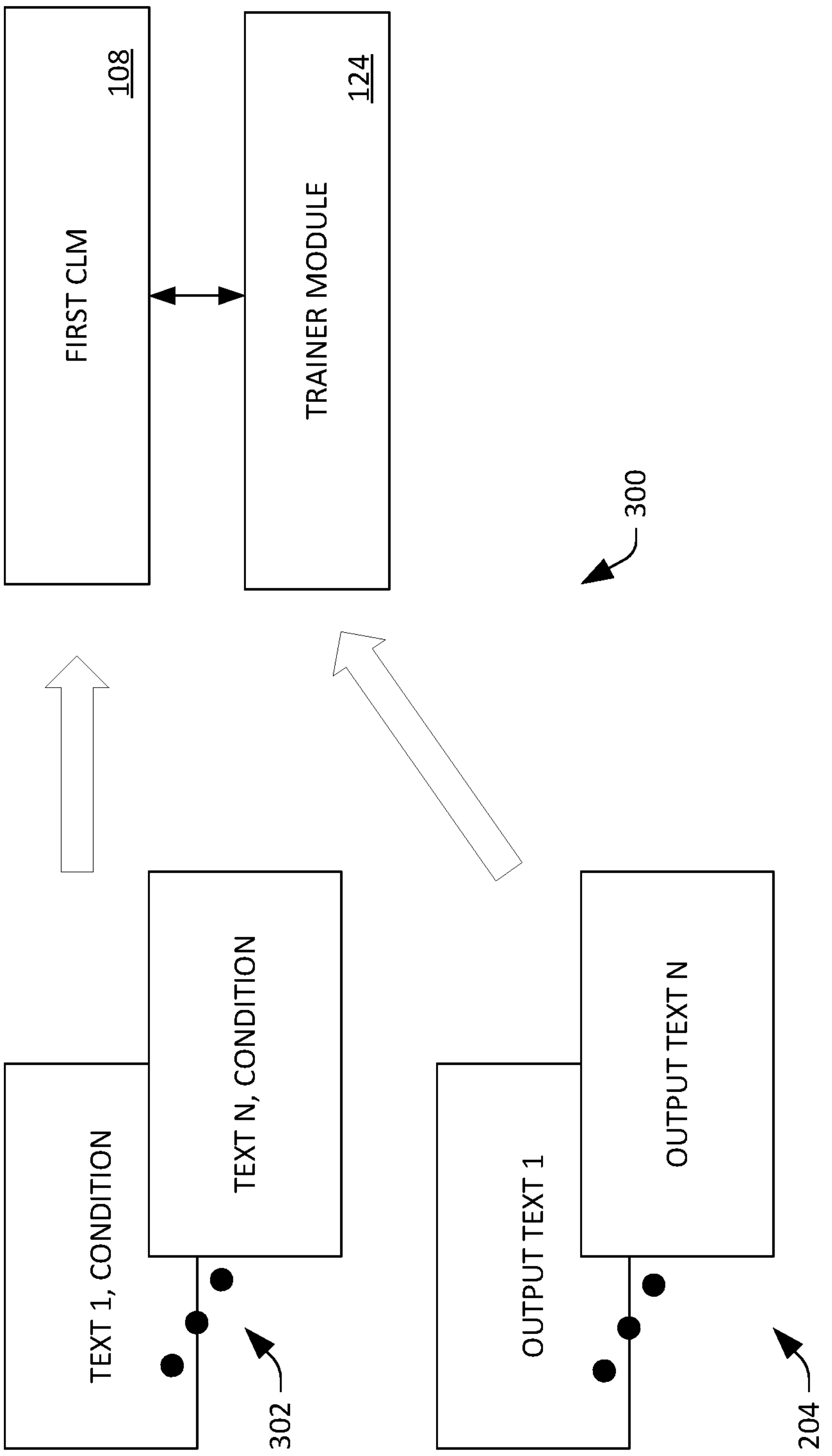
FIG. 3 is a functional block diagram that illustrates training of a CLM.

FIG. 3 is a functional block diagram 300 illustrating training of the first CLM 108. The first CLM 108 can be pretrained such that nodes of the first CLM 108 have an initial set of weights assigned thereto. The first CLM 108 receives texts and corresponding conditions 302 as input and generates respective output texts based upon the texts and corresponding conditions 302. The texts in the texts and corresponding conditions 302 are the texts 202 (FIG. 2), and the conditions in the texts and corresponding conditions 302 specify the attribute values output by the classifier 116.

The first CLM 108 generates output texts based upon the texts and corresponding conditions 302 and the trainer module 124 receives the (approved) output texts 204 that were previously created for the texts. The trainer module 124 can employ any suitable training technologies, such as backpropagation and stochastic gradient descent, to train the first CLM 108 through use of the output texts 204. The conditions can be textual values that are prepended or appended to the texts from the texts and conditions 302. Accordingly, it can be ascertained that the first CLM 108 is trained based upon texts, text summarizations of the texts (potentially generated by humans), and attributes of the text summarizations as identified by the classifier 116, where the attributes are employed to identify conditions that specify the attributes. Once trained, the first CLM 108 is configured to receive text (such as text extracted from a webpage) and a condition and is further configured to generate output text based upon the text and the condition, where the output text desirably has a value of an attribute specified by the condition.

Figure 4:
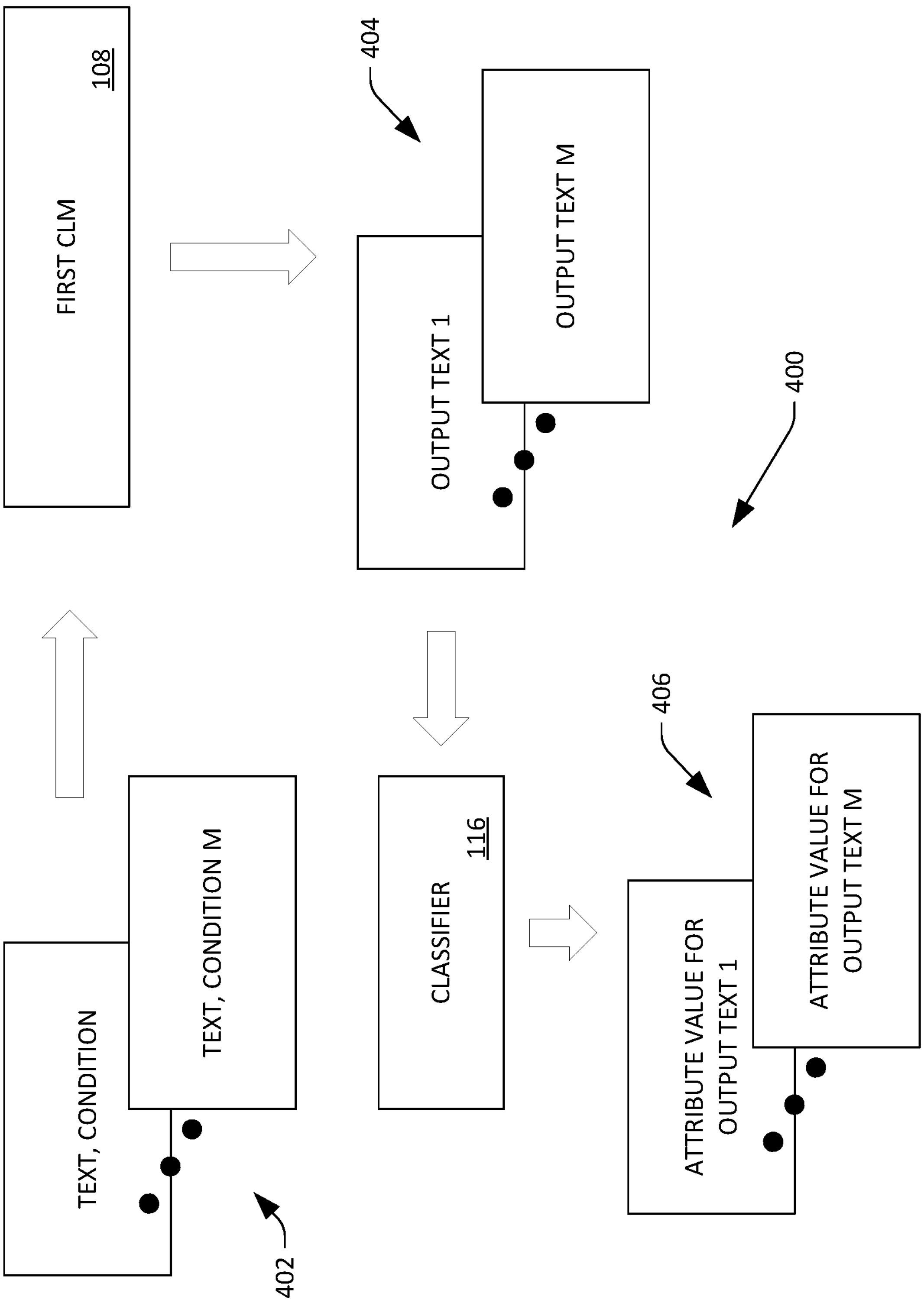
FIG. 4 is a functional block diagram that illustrates identification of attribute values of output texts generated by a CLM.

FIG. 4 is a functional block diagram 400 that illustrates generation of training data for training the second CLM 126. The first CLM 108 receives pairs of texts and conditions 402, where each pair includes text that is to be summarized and a condition that specifies a desired attribute of output text that summarizes the text. Text in a pair of text and conditions can be included in training data used to train the CLM 108 (text from the texts and conditions 302). However, a condition in the pair with the text is not the same condition used with the text to train the first CLM 108. For example, when the text is extracted from a webpage where a product is available for acquisition, an electronic advertisement of a first category may have been generated by an advertiser for the product, where the electronic advertisement is of a first category. Hence, the first CLM 108 can be trained based upon the text, a condition that specifies the first category, and the electronic advertisement. In FIG. 4, the text in a pair of texts and conditions may be the text extracted from the webpage, but the condition may specify a second category of electronic advertisement that differs from the first category. Therefore, the first CLM 108 is provided with texts from the training data used to train the first CLM 108, with the texts being assigned different conditions than what was used to train the first CLM 108, such that the first CLM 108 generates new output texts 404 based upon such texts (output texts that were not used to train the first CLM 108).

The output texts 404 are provided to the classifier 116 and the classifier 116, for each output text in the output texts 404, identifies a respective value for an attribute. The attribute may be sentiment, topic, length, advertisement category, and so forth. Thus, the classifier 116 outputs attribute values 406 that respectively correspond to the output text 404.

Figure 5:
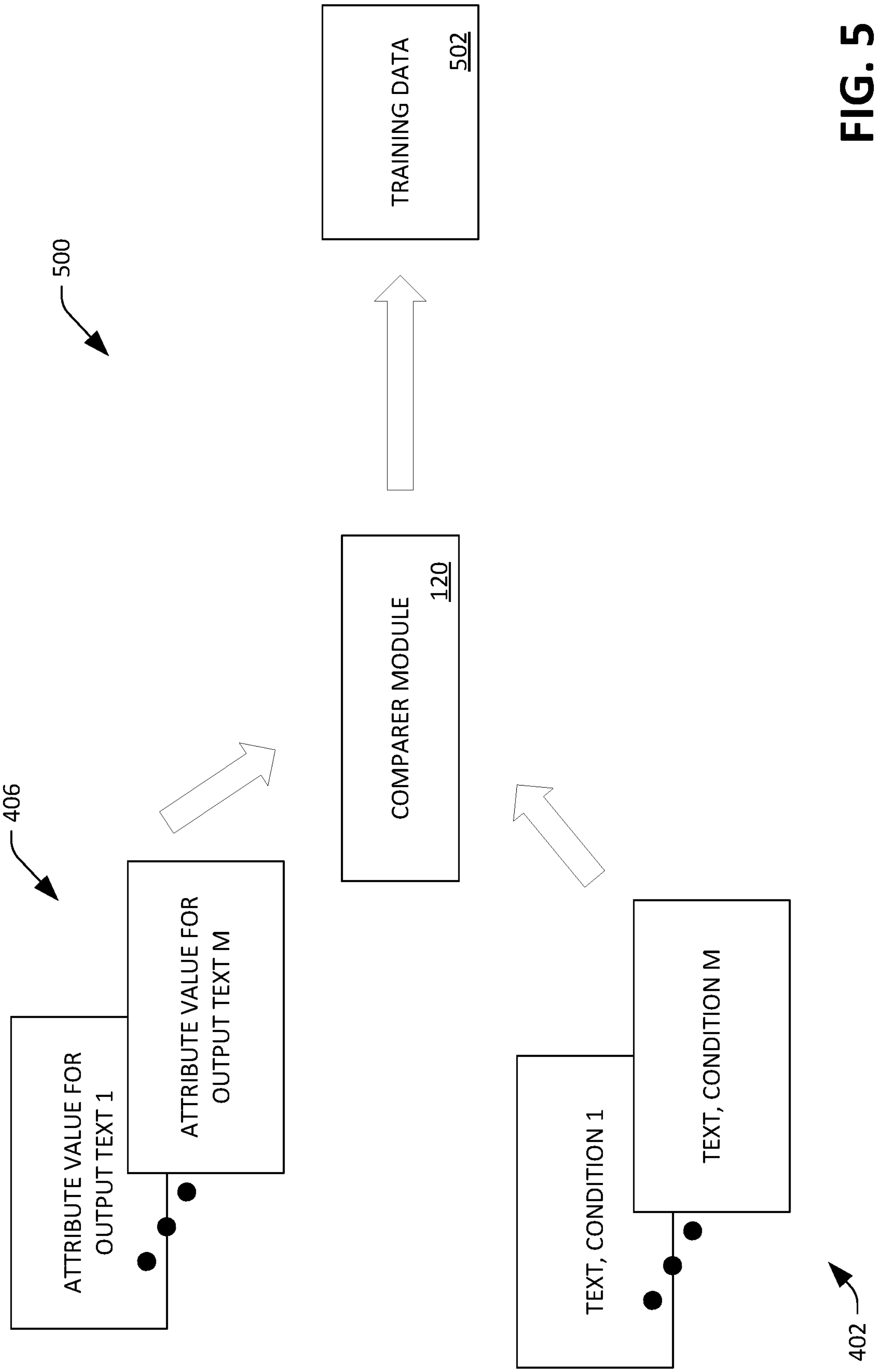
FIG. 5 is a functional block diagram that illustrates generation of training data for training a CLM.

FIG. 5 is a functional block diagram 500 illustrating the identification of tuples of [text, condition, output text] that can be used to train the second CLM 126. The comparer module 120 receives an attribute value for an output text and compares the attribute value with a condition used by the first CLM 108 to generate the output text. In an example, the comparer module 120 receives a first value of the attribute for first output text, and further receives a first condition provided to the first CLM 108, where the first CLM 108 generated the first output text based upon the first condition. The comparer module 120 determines whether the first value of the attribute matches the attribute value specified by the first condition. When the first value of the attribute matches the attribute value specified by the first condition, the comparer module 116 causes the text, the first condition, and the output text to be included in training data 502. The second CLM 126 is trained based upon this training data 502. In summary, then, the first CLM 108 is used to generate training data for training the second CLM 126, where the training data 502 for training the second CLM 126 is more balanced when compared to the training data used to train the first CLM 108.

Figure 6:
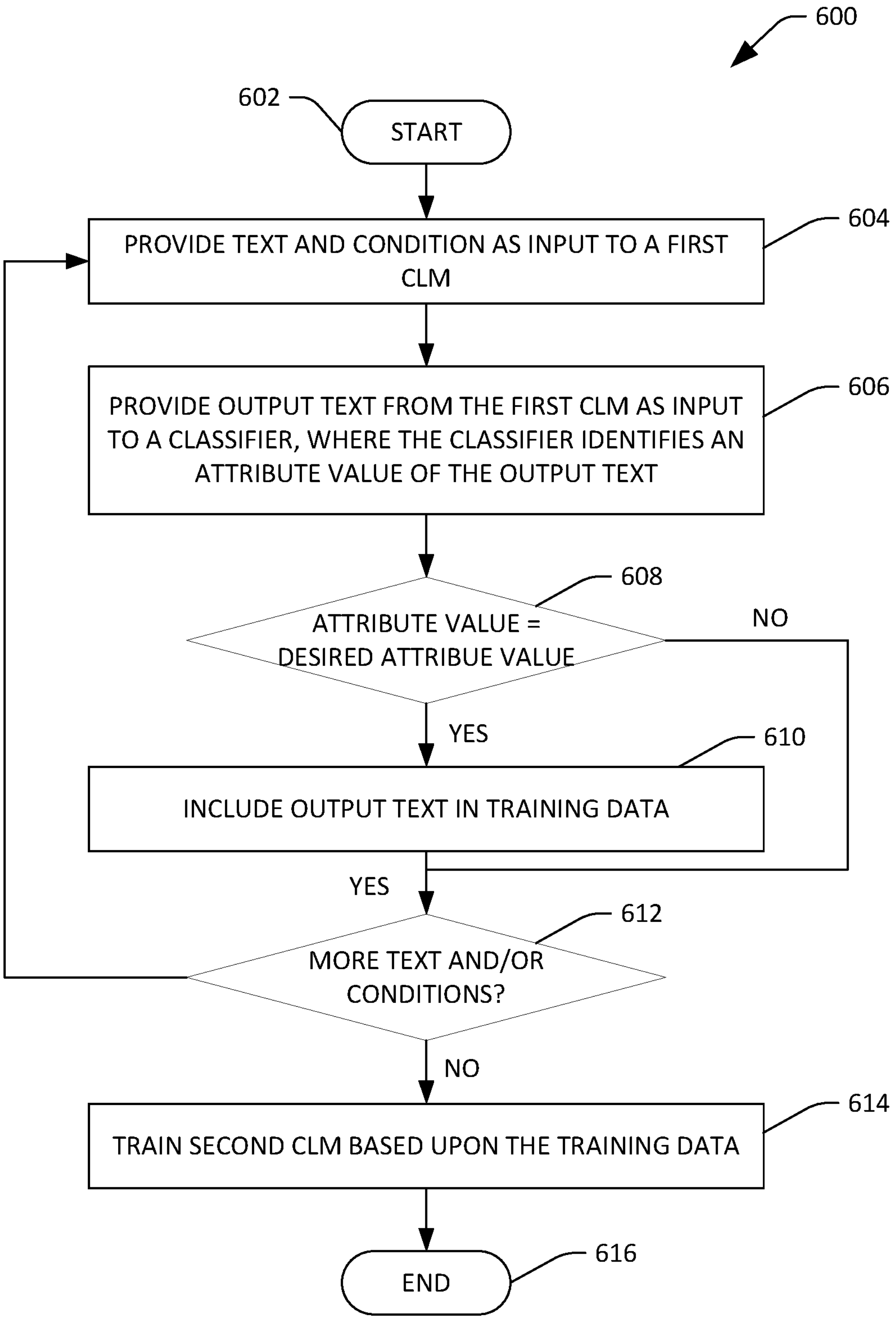
FIG. 6 is a flow diagram illustrating a methodology for generating training data for training a CLM and training such CLM.

FIG. 6 illustrates a methodology 600 relating to training a CLM through use of a balanced set of training data. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

The methodology 600 starts at 602, and at 604 text and a condition are provided as input to a first CLM. The first CLM has been trained to generate output texts based upon texts and conditions provided as input to the first CLM.

At 606, output text generated by the first CLM is provided as input to a classifier, where the classifier identifies an attribute value of the output text from amongst a predefined number of attribute values. As noted previously, the classifier can identify whether output text is "short" or "long." In another example, the classifier identifies sentiment of the output text. In yet another example, the classifier identifies category of advertisement.

At 608, a determination is made as to whether the attribute value identified by the classifier is equivalent to a desired attribute value. The desired attribute value is the attribute value specified by the condition that was provided as input to the first CLM. When it is determined that the attribute value is equivalent to the desired attribute value, the methodology 600 proceeds to 610, where the output text is included in training data for training a second CLM. In addition, the condition and the text provided as input to the first CLM are included in the training data.

Upon the output text being included in the training data or upon determining that the attribute value is not equivalent to be desired attribute value, the methodology 600 proceeds to 612 where a determination is made as to whether there are more texts and/or conditions to provide as input to the first CLM. When there are more texts and/or conditions that are to be provided as input to the first CLM, the methodology 600 returns to 604.

When there are no further texts and/or conditions to provide as input to the first CLM, the second CLM is trained based upon the training data. The methodology 600 completes at 614.

EXAMPLES

The technologies set forth herein were employed to generate news headlines and electronic advertisements based upon input texts. A training data set was split into train/dev/test as shown in Table 1 below:

TABLE 1

| Category | Train | Dev | i.i.d. test | Bal. test |
|---|---|---|---|---|
| Short | 31,245 | 3,614 | 4,001 | 5,509 |
| Long | 57,351 | 6,666 | 7,074 | 5,509 |
| Total | 88,596 | 10,280 | 10,240 | 11,018 |

The test set is referred to as an i.i.d. test set, as the test set has the same distribution of "short" and "long" headlines as the training set. The task to be performed is generation of news headlines from news content while using a binary condition of "short" or "long" to control the output length of the headline. The output length was measured in number of characters. A headline was labeled as "short" when a number of characters of the headline, including whitespace, was no more than 55, and the headline was labeled "long" otherwise.

During experiments, both short and long headlines were generated for each news source by the first CLM 108, and a balanced test set was used to measure performance of the second CLM 126. As the i.i.d. test set had the same spurious correlation between headline length and news content as the training set, the i.i.d. test set was used to demonstrate the existence of spurious correlation and its impact on controllability.

To identify correlation between news content and headline length in the training data, a Roberta-base model was fine-tuned with a binary classification head to predict category of a news headline ("short" or "long") based on the news article that had the headline. The area under the ROC curve (AUC) and accuracy on the i.i.d. test set are much higher than random guessing or prior probability can achieve, which illustrates the existence of spurious correlation between news content and headline length. It was observed that longer news content usually has longer headlines associated therewith. The Pearson's and Spearman's rs between the character length of news content and headline are 0.13 and 0.11, respectively. A possible explanation is that a more involved story needs more words for both content and headline. A logistic regression model with L2 norm was trained for the same task of predicting news headline length based upon the article having the headline. The logistic regression model uses 1e5 unigram and bigram features and achieves AUC of 0.7 on the i.i.d. test set. By examining the top features, it was found that the topic of the news article is correlated with headline length. For example, news articles of general topics tend to have longer headline lengths, while news articles of niche topics tend to have shorter headline lengths.

The first CLM 108 was trained with a learning rate at 1e-5 and results were averaged over five random seeds with confidence interval from t-distribution for experiments on the training data set. The controllability was measured as the macro-averaged F1 score between the category specified by the condition and the actual category of the output. On the i.i.d. test set two experiments were carried out to test performance of the first CLM 108. In the first experiment, the first CLM 108 was used to generate headlines using the category of the ground truth as the condition, so the spurious correlation was retained at test time. In the second experiment, the condition was flipped by using the opposite category of the ground truth. Therefore, the first CLM 108 was caused to generate counterfactual examples. The controllability, as measured by macro-F1, degrades significantly from 88.8%+/−0.5% to 63.1%+/−0.5% between the first and second experiments, which suggests that the spurious correlation between news content and headline length is being exploited by the first CLM 108. Accordingly, there is potential for improving controllability of the model if the spurious correlation can be reduced during training.

The technologies described herein were employed to create an augmented training data set, and the second CLM 126 was trained using the augmented training set. The augmented training data set was provided to the Robert-base model with the binary classification head; as shown in Table 2, the AUC of the Roberta-base classifier predicting category from news content is closer to 50%, which confirms that the spurious correlation is reduced.

TABLE 2

| Data set | Macro-FI | AUC |
|---|---|---|
| i.i.d. test | 70.6 | 79.3 |
| Train | 78.3 | 87.5 |
| Augmented Training Data | 58.0 +/− 0.3 | 62.3 +/− 0.3 |

On the augmented training set, the second CLM 126 was trained in a manner similar as to how the first CLM 108 was trained. Performance was evaluated on the balanced test set for the actual application scenario in two aspects: 1) ROUGE scores for language quality (ROUGE 1f, 2f, L (R1, R2, RL)); and 2) macro-F1 for controllability. The results are shown in Table 3. Utilizing the technologies described herein, the second CLM 126 exhibited an improvement in controllability by 4.5% over the first CLM 108, where language quality associated with the second CLM 126 was close to that associated with the first CLM 108 with no statistically significant difference in ROGUE scores.

TABLE 3

| CLM | R1 | R2 | RL | Macro-F1 |
|---|---|---|---|---|
| First CLM | 32.6 +/− 0.1 | 13.4 +/− 0.1 | 27.1 +/1 0.1 | 78.0 +/− 0.7 |
| Second CLM | 32.5 +/− 0.1 | 13.4 +/1 0.1 | 27.1 +/1 0.1 | 82.5 +/− 0.5 |

The technologies described herein were also employed in connection with generating sponsored search advertisements. Search engines derive a significant amount of revenue by displaying electronic advertisements along with search results. To start a traditional advertising campaign, advertisers need to manually create electronic advertisements for their landing pages, which are the webpages provided to users when users click on the electronic advertisements. The technologies described herein relate to automating the process, such that an advertiser can provide a website domain to start an advertisement campaign. A web crawler can crawl the landing pages under the provided domains and the landing page HTMLs can be parsed to extract textual features, such as document title and heading, from the landing pages. CLMs can be used to generate electronic advertisements based upon text extracted from landing pages, where the advertisements are then ingested into an online data store. A ranking and auction system decides which electronic advertisement to display in response to a user query.

A text advertisement typically includes a title and a description, where the title and description are collectively referred to as advertisement assets. CLMs can be used to generate advertisement titles and descriptions from landing page features with two conditions: 1) a first condition that indicates whether the CLM is to output a title or a description of an electronic advertisement; and 2) a second condition that specifies a category of the title or description. Example categories have been referenced above. The categories were identified based on common advertising strategies and their general applicability to most landing pages. The goal of the experiment was to generate different advertisements across several categories for the same landing page ahead of time, and thereafter let a ranking model pick the best advertisement to display at query time. For example, while "buy truck engines now" may be a good advertisement for the query "truck engine", "new and used truck engines" is a better advertisement for the query "used truck engine". By generating electronic advertisements across different categories, a wider range of user interest can be matched and therefore clickthrough rate can be improved.

To classify an electronic advertisement title or description into one of nine separate categories, the classifier 116 was developed. The classifier was trained on 6000 labeled data with macro-F1 70% for testing. The classifier 116 was also used to classify advertisements generated by the first CLM 108 and for evaluating controllability.

The data set was constructed from advertiser-written advertisements in the English language. Some statistics are shown in Table 4. The data was split in a way that advertisements in train/dev/test are from different advertisers. For a given landing page, advertisers write on average 2.4 advertisement titles and 1.3 advertisement descriptions, which cover on average 1.9 categories in the training set. The test set has higher category coverage of 2.6. Although the test set is not strictly i.i.d. as the training set, it is nevertheless referred to as the i.i.d. test set. ROGUE score was used for evaluation. To measure controllability, a source-only balanced test set was constructed by retaining all of the unique landing pages in the i.i.d. test set and iterating through all of the conditions for generating nine titles and nine descriptions covering every category.

TABLE 4

| Category | Train | Dev | i.i.d. test |
|---|---|---|---|
| Product or Service | 27% | 22% | 23% |
| Call to Action | 18% | 19% | 19% |
| Location | 14% | 11% | 11% |
| Highlight | 13% | 16% | 16% |
| Inventory and Selection | 9% | 9% | 8% |
| Advertiser Name or Brand | 7% | 6% | 6% |
| Price and Fees | 6% | 11% | 10% |
| Benefit | 5% | 4% | 5% |
| Customer Problem | 2% | 2% | 2% |
| Total | 6.6M | 201K | 190K |
| Category coverage | 1.9 | 2.3 | 2.6 |

To detect spurious correlation in the training dataset, a Roberta-base classifier was fine-tuned to predict the advertisement category from the text extracted from the landing page. As shown in Table 5, the 74% AUC on i.i.d. test set is much higher than a random guess and the 24% macro-F1 is much higher than 1/9 (11%) from prior probability. Accordingly, spurious correlation exists between landing page text and advertisement category.

Such correlation is expected. Advertisers write advertisements that perform well for their landing pages on average, so different categories are preferred for different landing pages. While the majority category is product or service within the data as depicted in Table 4, when the data into different business industries, it was found that the majority category is location for travel and tourism industry, call to action for vehicle industry, and highlight for retail industry (which includes promotion, shipping, or other information to make a product stand out). While an advertisement in the majority category may perform well on average, an even better chance to obtain a user click can be acquired by generating advertisements in all categories and displaying the best advertisement at query time.

The first CLM 108 was trained with a learning rate picked at 5e-5. Training data was augmented by using the first CLM 108 to generate advertisement titles and headlines for unique landing pages in the training set in counterfactual categories, and the classifier 116 was employed to filter advertisements generated by the CLM 108 of an undesired category, resulting in approximately 40% advertisements generated by the first CLM 108 being filtered. The size of the augmented training set was approximately 2.2 times the size of the original training set. As shown in Table 5, the spurious correlation between the input text and the advertisement category is significantly reduced in the augmented training set.

TABLE 5

| Dataset | Macro-F1 | AUC |
|---|---|---|
| i.i.d. test | 24 | 74 |
| Train | 33 | 80 |
| Augmented Training Set | 17 | 60 |

Automatic evaluations are shown in Table 6. The second CLM 126 was found to achieve improved language quality relative to the first CLM 108 as seen from the ROGUE score as well as improved controllability relative to the first CLM 108 as seen from the macro-F1.

TABLE 6

| CLM | R1 | R2 | RL | Macro-F1 |
|---|---|---|---|---|
| First CLM 108 | 27.7 | 11.9 | 26.1 | 68.2 |
| Second CLM 126 | 28.1 | 12.2 | 26.5 | 80.6 |

Example Computing Environment

Figure 7:
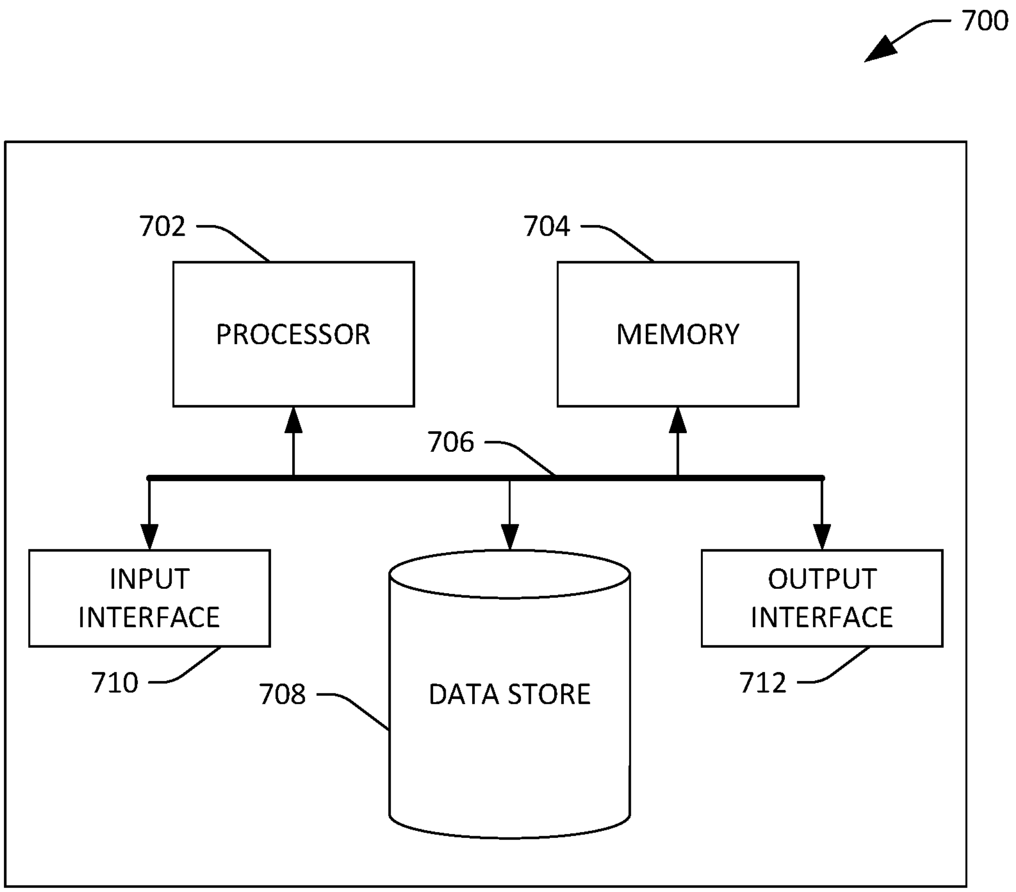
FIG. 7 depicts an example computing system.

Referring now to FIG. 7, a high-level illustration of an exemplary computing device 700 that can be used in accordance with the systems and methodologies disclosed herein is illustrated. For instance, the computing device 700 may be used in a system that generates output text based upon input text and a condition. By way of another example, the computing device 700 can be used in a system that is configured to construct training data for training a CLM. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store output text, conditions, attribute values, etc.

The computing device 700 additionally includes a data store 708 that is accessible by the processor 702 by way of the system bus 706. The data store 708 may include executable instructions, input texts, output texts, conditions, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Features have been described herein in accordance with at least the following examples.

(A1) In an aspect, described herein is a method for training a language model, where the method is performed by a processor. The method includes providing, as input to a first computer-implemented language model, 1) text; and 2) a condition, where the first computer-implemented language model generates output text based upon the text and the condition, and further where the condition corresponds to a desired attribute value for the output text. The method also includes providing the output text as input to a computer-implemented classifier, where the computer-implemented classifier generates an output based upon the output text, and further where the output is indicative of an actual attribute value for the output text. The method further includes determining, based upon the output of the classifier, that the actual attribute value of the output text identified by the classifier is equivalent to the desired attribute value of the output text. The method additionally includes including the output text in training data upon determining that the actual attribute value is equivalent to the desired attribute value, where the output text is labeled with the actual attribute value. The method also includes training a second computer-implemented language model based upon the training data, where the second computer-implemented model, when trained, is configured to receive texts and corresponding conditions as input and generate output texts based upon the texts and the corresponding conditions.

(A2) In some embodiments of the method of (A1), the method also includes extracting the text from a webpage prior to providing the text and the condition as input to the computer-implemented language model, where the output text is a summarization of the text extracted from the webpage.

(A3) In some embodiments of the method of (A2), the output text is assigned to the webpage in a search engine index such that when the webpage is identified as being relevant to a query the output text is presented as a portion of a search result that corresponds to the webpage.

(A4) In some embodiments of the method of at least one of (A1)-(A3), the condition corresponds to a length of the output text.

(A5) In some embodiments of the method of at least one of (A1)-(A2), the output text is an electronic advertisement that has a predefined format, where the electronic advertisement includes a title and a description.

(A6) In some embodiments of the method of (A5), the condition identifies a category of electronic advertisement from amongst a plurality of predefined categories, where the desired attribute value is the category, and further where the actual attribute value is the category.

(A7) In some embodiments of the method of (A1), the method further includes extracting the text from a webpage prior to providing the text and the condition as input to the computer-implemented language model, where the webpage comprises a news article, and further where the output text is a headline for the news article.

(A8) In some embodiments of the method of at least one of (A1)-(A7), the computer-implemented language model has been previously trained based upon the text.

(A9) In some embodiments of the method of at least one of (A1)-(A8), the method also includes providing, as input to the first computer-implemented language model, 1) second text; and 2) the condition, where the first computer-implemented language model generates second output text based upon the second text and the condition. The method further includes providing the second output text as input to the computer-implemented classifier, where the computer-implemented classifier generates a second output based upon the second output text, and further where the second output is indicative of a second actual attribute value for the second output text. The method additionally includes determining, based upon the second output of the classifier, that the second actual attribute value of the second output text identified by the classifier does not match the desired attribute value. The method also includes refraining from including the second output text in the training data upon determining that the second actual attribute value of the second output text does not match the desired attribute value.

(B1) In another aspect, a method executed by a processor of a computing system is described herein, where the method includes providing text and a condition to a first computer-implemented conditional language model (CLM), where the first CLM generates output text having a value for an attribute based upon the text and the condition, and further where the condition specifies a desired value for the attribute. The method also includes providing the output text generated by the first CLM to a classifier, where the classifier identifies, based upon the output text, the value for the attribute of the output text from amongst several potential values for the attribute. The method further includes performing a comparison between the value for the attribute identified by the classifier with the desired value for the attribute specified by the condition. The method additionally includes determining, based upon the comparison, that the value for the attribute identified by the classifier matches the desired value for the attribute specified by the condition. The method also includes including the output text and the value for the attribute identified by the classifier in training data upon determining that the value for the attribute identified by the classifier matches the value for the attribute specified by the condition. The method further includes training a second CLM model based upon the training data, where the second CLM model, when trained, is configured to receive texts and corresponding conditions as input and generate output texts based upon the texts and corresponding conditions.

(B2) In some embodiments of the method of (B1), the attribute is a category of the output text.

(B3) In some embodiments of the method of (B2), the output text is at least a portion of an electronic advertisement, and further wherein the category is from amongst several potential categories of electronic advertisement.

(B4) In some embodiments of at least one of the methods of (B1)-(B3), the method also includes extracting the text from a webpage prior to providing the text as input to the first CLM.

(B5) In some embodiments of at least one of the methods of (B1) or (B4), the output text is a summarization of the text.

(B6) In some embodiments of the method of (B1), the method further includes extracting the text from a webpage prior to providing the text as input to the first CLM, where a product is available for acquisition on the webpage, and further where the output text is a title of an electronic advertisement for the product.

(B7) In some embodiments of the method of at least one of (B1)-(B6), the attribute is a length of the output text.

(C1) In another aspect, described herein is a computing system that includes a processor and memory, where the memory stores instructions that, when executed by the processor, cause the processor to perform at least one of the methods described herein (e.g., at least one of (A1)-(A9) or (B1)-(B7)).

(D1) In yet another aspect, described herein is a computer-readable storage medium that stores instructions that, when executed by a processor, causes the processor to perform at least one of the methods described herein (e.g., at least one of (A1)-(A9) or (B1)-(B7)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system that is configured to train a language model, the computing system comprising: a processor; and memory storing instructions that, when executed by the processor, cause the processor to perform operations comprising:

providing, as input to a first computer-implemented language model: text; and a condition, wherein the first computer-implemented language model generates output text based upon the text and the condition, and further wherein the condition corresponds to a desired attribute value for the output text;

providing the output text as input to a computer-implemented classifier, wherein the computer-implemented classifier generates an output based upon the output text, and further wherein the output is indicative of an actual attribute value for the output text;

based upon the output of the computer-implemented classifier, determining that the actual attribute value of the output text identified by the computer-implemented classifier is equivalent to the desired attribute value of the output text;

upon determining that the actual attribute value is equivalent to the desired attribute value, including the output text in training data, wherein the output text is labeled with the actual attribute value; and training a second computer-implemented language model, different from the first computer-implemented language model, based upon the training data, the training data comprising the output text generated by the first computer-implemented language model, the second computer-implemented language model, when trained, being configured to receive input comprising a second text and corresponding second condition and generate second output texts based upon the training data and the second text and the corresponding second condition.

2. The computing system of claim 1, the acts further comprising:

prior to providing the text and the condition as input to the first computer-implemented language model, extracting the text from a webpage, and further wherein the output text is a summarization of the text extracted from the webpage.

3. The computing system of claim 2, wherein the output text is assigned to the webpage in a search engine index such that when the webpage is identified as being relevant to a query the output text is presented as a portion of a search result that corresponds to the webpage.

4. The computing system of claim 2, wherein the condition corresponds to a length of the output text.

5. The computing system of claim 1, wherein the output text is an electronic advertisement that has a predefined format, and further wherein the electronic advertisement includes a title and a description.

6. The computing system of claim 5, wherein the condition identifies a category of electronic advertisement from amongst a plurality of predefined categories, wherein the desired attribute value is the category, and further wherein the actual attribute value is the category.

7. The computing system of claim 1, the acts further comprising:

prior to providing the text and the condition as input to the first computer-implemented language model, extracting the text from a webpage, wherein the webpage comprises a news article, and further wherein the output text is a headline for the news article.

8. The computing system of claim 1, wherein the first computer-implemented language model has been previously trained based upon the text.

9. The computing system of claim 1, the acts further comprising:

providing, as input to the first computer-implemented language model:

third text; and the condition, wherein the first computer-implemented language model generates third output text based upon the second text and the condition;

providing the third output text as input to the computer-implemented classifier, wherein the computer-implemented classifier generates a second output based upon the third output text, and further wherein the second output is indicative of an actual attribute value for the third output text;

based upon the second output of the computer-implemented classifier, determining that the actual attribute value of the third output text identified by the computer-implemented classifier does not match the desired attribute value; and upon determining that the actual attribute value of the third output text does not match the desired attribute value, excluding the second output text from the training data.

10. A method executed by a computer processor, the method comprising:

providing text and a condition to a first computer-implemented conditional language model (CLM), wherein the first CLM generates output text having a value for an attribute based upon the text and the condition, and further wherein the condition specifies a desired value for the attribute;

providing the output text generated by the first CLM to a computer-implemented classifier, wherein the computer-implemented classifier identifies, based upon the output text, the value for the attribute of the output text from amongst several potential values for the attribute;

performing a comparison between the value for the attribute identified by the computer-implemented classifier with the desired value for the attribute specified by the condition;

based upon the comparison, determining that the value for the attribute identified by the computer-implemented classifier matches the desired value for the attribute specified by the condition;

upon determining that the value for the attribute identified by the computer-implemented classifier matches the desired value for the attribute specified by the condition, including the output text and the value for the attribute identified by the computer-implemented classifier in training data; and training a second CLM, different from the first CLM, based upon the training data, the training data comprising the output text generated by the first CLM, the second CLM, when trained, being configured to receive second text and a corresponding second condition as input and generate second output text based upon the training data and the second text and a corresponding second condition.

11. The method of claim 10, wherein the attribute is a category of the output text.

12. The method of claim 11, wherein the output text is at least a portion of an electronic advertisement, and further wherein the category is from amongst several potential categories of electronic advertisement.

13. The method of claim 10, further comprising:

prior to providing the text as input to the first CLM, extracting the text from a webpage.

14. The method of claim 10, wherein the output text is a summarization of the text.

15. The method of claim 10, further comprising:

prior to providing the text as input to the first CLM, extracting the text from a webpage, wherein a product is available for acquisition on the webpage, and further wherein the output text is a title of an electronic advertisement for the product.

16. The method of claim 10, wherein the attribute is a length of the output text.

17. A computer-readable storage medium comprising instructions that, when executed by a processor, cause the processor to perform acts comprising:

providing, as input to a first computer-implemented language model:

text; and a condition, wherein the first computer-implemented language model generates output text based upon the text and the condition, and further wherein the condition corresponds to a desired attribute value for the output text;

providing the output text as input to a computer-implemented classifier, wherein the computer-implemented classifier generates an output based upon the output text, and further wherein the output is indicative of an actual attribute value for the output text;

based upon the output of the computer-implemented classifier, determining that the actual attribute value of the output text identified by the computer-implemented classifier is equivalent to the desired attribute value of the output text;

upon determining that the actual attribute value is equivalent to the desired attribute value, including the output text in training data, wherein the output text is labeled with the actual attribute value; and training a second computer-implemented language model, different from the first computer-implemented language model, based upon the training data, the training data comprising the output text generated by the first computer-implemented language model, the second computer-implemented language model, when trained, being configured to receive input comprising a second text and corresponding second condition and generate second output text based upon the training data and the second text and corresponding second condition.

18. The computer-readable storage medium of claim 17, the acts further comprising:

prior to providing the text and the condition as input to the first computer-implemented language model, extracting the text from a webpage, and further wherein the output text is a summarization of the text extracted from the webpage.

19. The computer-readable storage medium of claim 18, wherein the output text is assigned to the webpage in a search engine index such that when the webpage is identified as being relevant to a query the output text is presented as a portion of a search result that corresponds to the webpage.

20. The computer-readable storage medium of claim 18, wherein the condition corresponds to a length of the output text.

* * * * *